US006609971B2

(12) United States Patent
Vancura

(10) Patent No.: US 6,609,971 B2
(45) Date of Patent: Aug. 26, 2003

(54) PROLONGED CASINO GAME METHOD AND APPARATUS

(75) Inventor: Olaf Vancura, Las Vegas, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 0 days.

(21) Appl. No.: 09/908,657

(22) Filed: Jul. 18, 2001

(65) Prior Publication Data

US 2003/0027616 A1 Feb. 6, 2003

(51) Int. Cl.7 ............................ A63F 13/00; A63F 1/00
(52) U.S. Cl. ...................................... 463/16; 273/138.1
(58) Field of Search ................................ 463/1, 16–17, 463/20–22, 25–27, 29–32; 273/138.1, 139, 143 R, 142 D

(56) References Cited

U.S. PATENT DOCUMENTS 6,015,346 A * 1/2000 Bennett ....................... 463/20
6,089,976 A * 7/2000 Schneider et al. ............ 463/16
6,117,009 A * 9/2000 Yoseloff ...................... 463/20
6,159,097 A 12/2000 Gura
6,159,098 A * 12/2000 Slomiany et al. ............. 463/25
6,309,300 B1 * 10/2001 Glavich ....................... 463/26
6,347,996 B1 * 2/2002 Gilmore et al. ............... 463/17
6,375,187 B1 * 4/2002 Baerlocher .............. 273/143 R
6,413,161 B1 * 7/2002 Baerlocher et al. ........... 463/20
6,439,995 B1 * 8/2002 Hughs-Baird et al. ........ 463/20

FOREIGN PATENT DOCUMENTS

EP 0 945 837 A2 9/1999

OTHER PUBLICATIONS

Frank Legato, 15 New Slots You Must Play, Casino Player, Apr. 1999, vol. 11, No. 8, Casino Journal Publishing Group.
Frank Legato, 15 New Slots You Must Play, Casino Player, Jan. 2000, Casino Journal Publishing Group.

* cited by examiner

*Primary Examiner*—Kim Nguyen
(74) *Attorney, Agent, or Firm*—Dorr, Carson, Sloan & Birney, P.C.

(57) ABSTRACT

A casino game and method having at least one hidden attribute for each of a finite number of icons and at least one additional hidden attribute for at least one of the finite number of icons. An initial number of player's picks known to the player are provided and any additional picks found, as a result of the additional hidden attributes, by the player are accumulated to prolong the casino game. The casino game ends when the player's picks are used up.

18 Claims, 3 Drawing Sheets

PROLONGED CASINO GAME METHOD AND APPARATUS

FIELD OF THE INVENTION

The present invention relates to casino games and, in particular, to casino bonus games giving a player chances to make selections as part of the bonus game play.

Bonus games on casino slot machines have become very popular. To play a bonus game, a player typically must qualify by aligning several special symbols on the underlying traditional game. Play then switches over to a bonus game (either in a separate apparatus or a separate screen, e.g.), in which the player participates without additional wager but typically with an award at its conclusion. The amount of the bonus award is determined during and by bonus play.

Among bonus games, those in which the player chooses from among a plurality of objects are common.

For example, the games, Reel 'Em In! and Filthy Rich by WMS Gaming contain bonuses in which the player is presented with 5 objects (e.g., fishermen, pigs) and chooses one of them to reveal an award. The game Sphinx by Atronic also affords the player a choice of 5 objects, four of which reveal an immediate award, and one of which advances the player to an additional choice of 5 objects comprising larger awards.

The games American Pride by CDS (U.S. Pat. No. 6,089,976) and Pick 'N Pop by Anchor contain bonuses in which the player is presented with a predetermined number of objects (e.g., stars, balloons), each of which has an associated award. The player chooses until matching two awards; the matching award is then given to the player. The game The Munsters by IGT contains a bonus in which the player is presented with a predetermined number of objects, each of which has an associated award. The player chooses until matching three awards, which is then given to the player.

The games Jackpot Party and Monopoly Chairman of the Board by WMS Gaming (European Patent Application EP 0945837A2) contain a bonus in which the player is presented with a predetermined number of objects (e.g., boxes, cards) and chooses until selecting an "end of game" object (e.g., Go to Jail). Additionally, some objects (e.g., Get Out of Jail Free) may grant the player a nullification of a future "end of game" choice. The game Scrabble by WMS Gaming has a bonus in which the player chooses from various objects, until finding three "end of game" objects. Some objects grant the player a nullification of an "end of game" object.

The game Who Dunnit? By WMS Gaming (U.S. Pat. No. 6,159,097) has a bonus game in which the player makes choices (e.g., suspects) until finding a desired choice (e.g., the guilty suspect), with successively lower awards depending on how many choices are required to make the desired choice.

The game Sphinx by Atronic contains a bonus in which the player chooses from among five objects. Four of the objects have awards, and the fifth advances the player to another set of five objects, all of which have enhanced awards.

The game Battleship All Aboard by Mikohn, the assignee of the present disclosure, has a bonus in which the player chooses from among five objects (e.g., flags), four of which have awards, and one of which advances the player to a different bonus game.

Statement of the Problem

While the current state of bonus play suggests a variety of bonus games with choices, they share in common that each choice reveals one associated value. It would be desirable to create a bonus game in which a player choice of an object revealed two or more associations, one of which may be an award. In practice, the second association may be a modification of the number of choices remaining or a modification of other attributes associated with the bonus game.

Solution to the Problem

The solution, as presented herein, comprises a bonus game in which the player begins with an initial number of picks, or choices, and selects from among a plurality of objects. Associated with some objects is more than one action. For example, while some objects may have only one association (an award), other objects have two associations (an award and additional picks). In this manner, the player's enjoyment of playing the bonus game may be prolonged, since some choices yield additional picks.

It is an advantage that the casino bonus game as disclosed herein allows the player different ways to pick awards, either with or without additional picks.

It is a further advantage that the casino bonus game disclosed herein has significant suspense for the player in making choices that may or may not yield additional picks.

It is a further advantage that the casino bonus game as disclosed herein is one in which the player does not know when the bonus game will end.

It is a further advantage that the casino bonus game as disclosed herein is one in which all of the objects' award values may be successfully chosen by the player choosing a "winner takes all" object.

DETAILED DESCRIPTION OF PREFERRED EMBODIMENT

Figure 1:
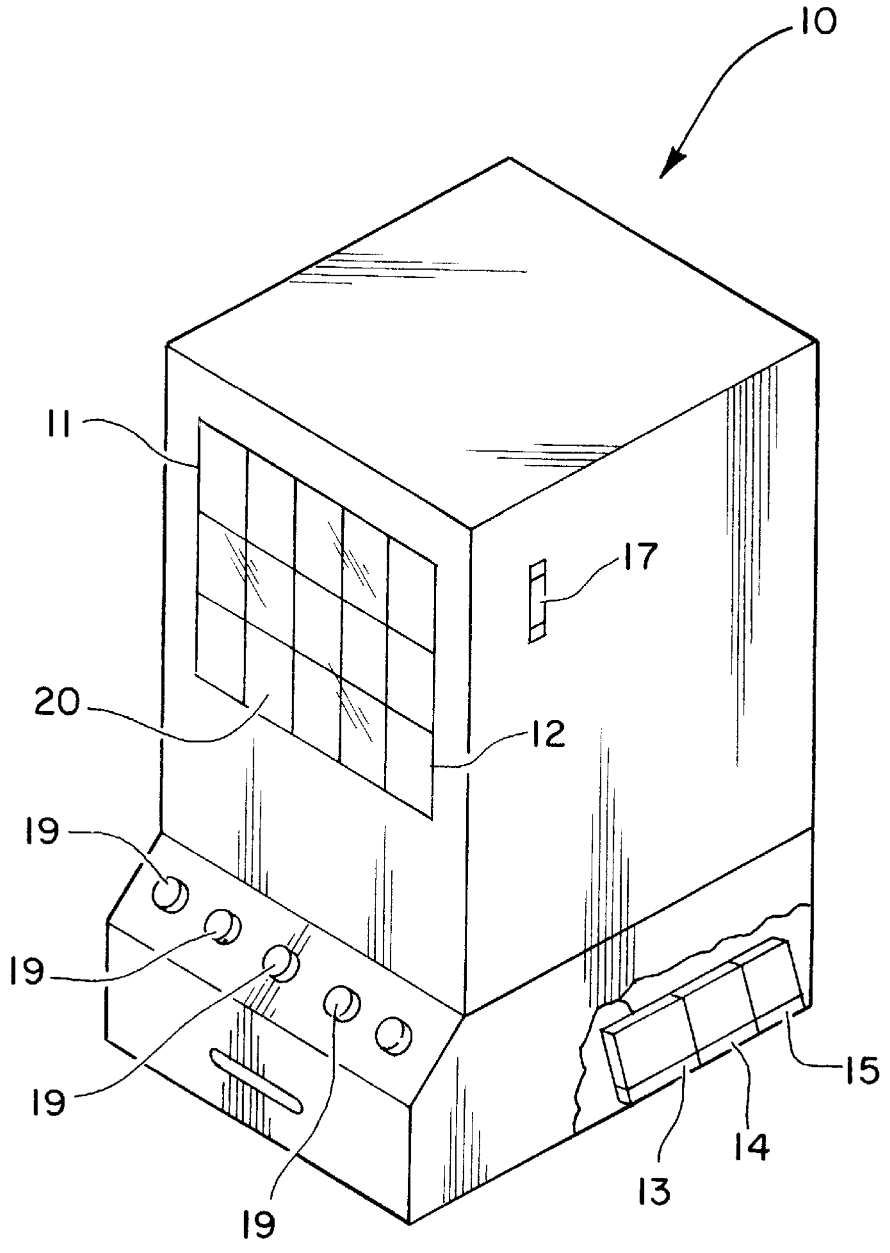
FIG. 1 is a perspective view of one apparatus preferably including a base game and a bonus game including the methods capable of prolonged play.

FIG. 1 is a perspective view of one apparatus 10 preferably including a base game and/or a bonus game including the methods capable of prolonged play. In a preferred embodiment, the base game is a five-reel video slot machine, with the bonus game initiated via a combination of special reel-strip symbols referred to as trigger symbols. FIG. 1 the perspective view of apparatus 10 preferably includes the five-reel video slot machine having the bonus game both of which can appear on video screen 11 in sequence. That is, if the base game is a five-reel slot then the video screen 11 shows that game until entry to the bonus game is achieved thereafter the prolonged game disclosed and described herein after appears on the video screen 11.

The video screen 11 is used to simulate reel motion of a mechanical slot machine during the play of the five-reel slot machine and is also used as a display 12 for the bonus game to the player. Such video screens 11 are commonly a part of casino games including slot machines on the video screen 11. The video screen 11 can be the display 12 for a software program 13 with memory 14 in a processor 15 to deliver graphs to the display 12 and sound to simulate any kind of interactive game desired. In FIG. 1 the software program 13 with memory 14 in processor 15 is shown at the bottom of apparatus 10 whereat it is cutaway. Skilled artisans have produced a wide variety of such displays 12 to appeal to players and provide practically any type of challenge to the player.

Figure 2:
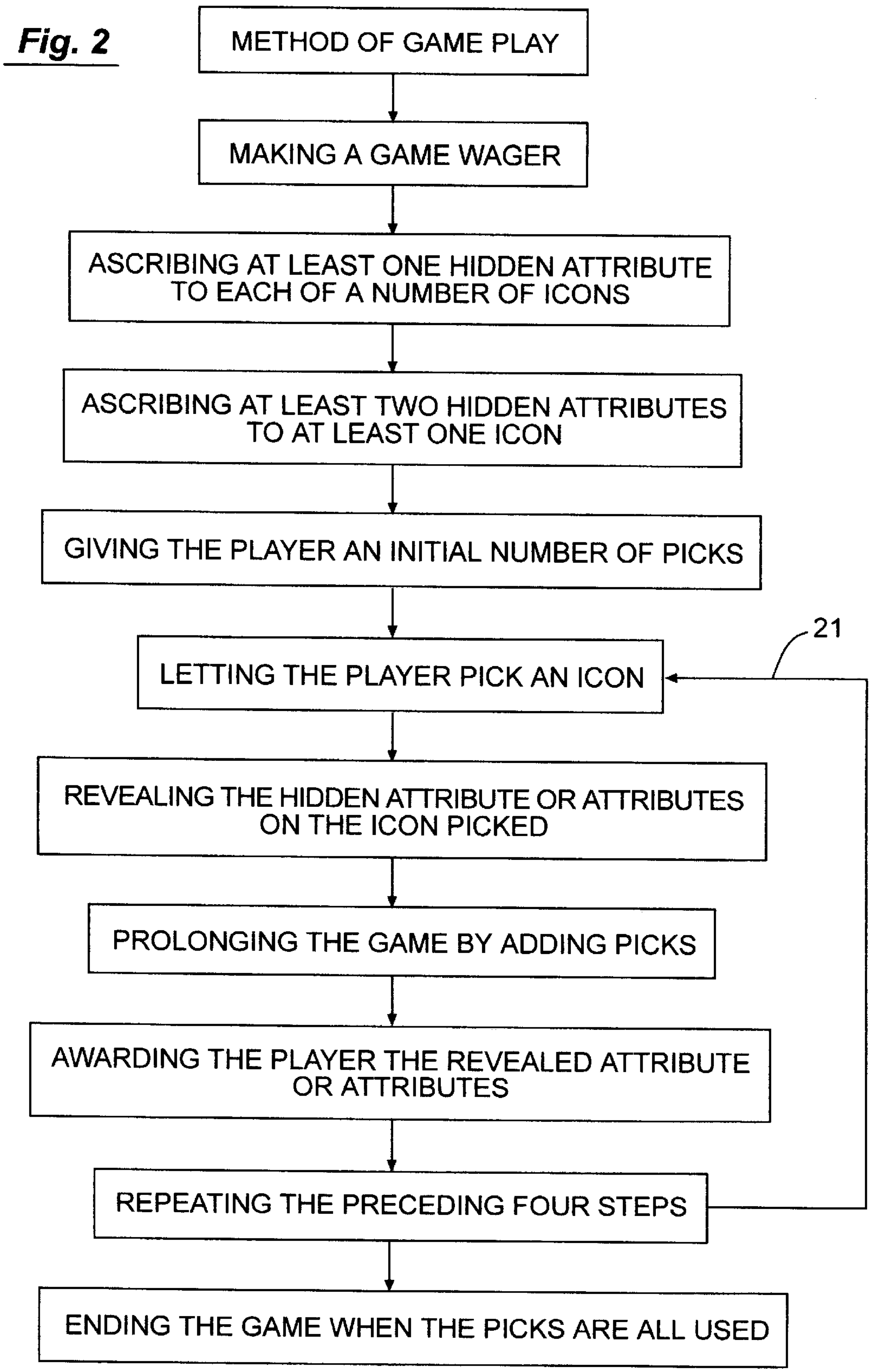
FIG. 2 is a flow chart including the steps of the preferred methods of prolonged play of the bonus game.

FIG. 2 is a flow chart including steps included in the preferred methods of prolonged play of the bonus game. The flow chart of FIG. 2 is merely representative of some steps of the method of play and how they follow and interrelate with one another. Of particular interest is the arrow from the penultimate block that returns upwardly to prolong play in accord with the disclosure of examples herein after presented.

Figure 3:
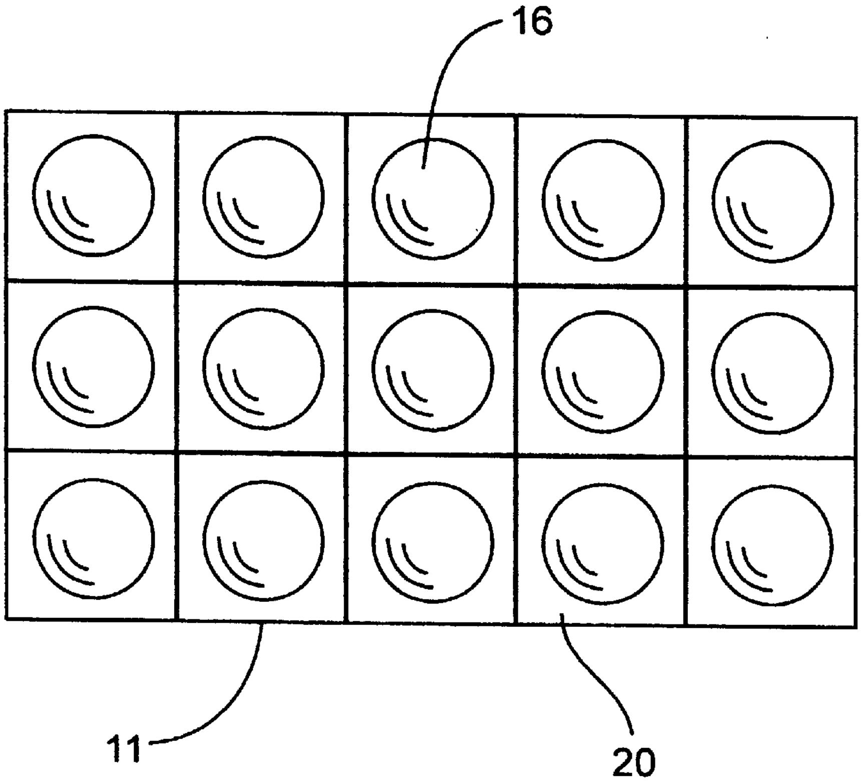
FIG. 3 is a schematic representation of 15 globes distributed in a 3 by 5 matrix on the video screen of a bonus game.

FIG. 3 is a schematic representation showing 15 globes 16 distributed in a 3 by 5 matrix on the video screen 11 of a bonus game of apparatus 10 of FIG. 1. In a first preferred method of play suitable for a bonus game of questions and answers such as, "Ripley's Believe It or Not!", the fifteen objects or icons (used interchangeably herein) are represented as globes 16 in FIG. 3. The globes 16 are distributed in a 3×5 matrix on the screen as shown in FIG. 3. However, any suitable on-screen depiction is possible and within the scope of the present disclosure. Three or more trigger symbols on the five reel slot display are required to start the bonus game. When three trigger or initiation symbols qualified the player for the bonus round, then the player is initially given three selections, choices, or picks (these terms are used interchangeably throughout this disclosure). Likewise, when four trigger symbols qualified the player, then the player is initially given four selections. Consider the following tabular representation of the possible when objects or icons (in this instance "Globes" are presented on the bonus game video screen for the player to select:

| Globe position | Value Hidden | Extra Picks |
|---|---|---|
| 1 | 1x | 0 |
| 2 | 1x | 0 |
| 3 | 1x | 0 |
| 4 | 1x | 2 |
| 5 | 2x | 0 |
| 6 | 2x | 0 |
| 7 | 2x | 1 |
| 8 | 3x | 0 |
| 9 | 3x | 1 |
| 10 | 4x | 1 |
| 11 | 5x | 0 |
| 12 | 6x | 0 |
| 13 | 8x | 0 |
| 14 | "Believe It" | 0 |
| 15 | "Not!" | 0 |

All the globes 16 have an attribute and all but two globes 16, in the table above have an associated "value" which is hidden. At such time as the player chooses a globe 16, that globe 16 appears on the video screen 11 to rotate on its axis (not shown) but "preferably vertical" to show or reveal the associated value of that selected globe's 16, opposite side. Clearly, the globe 16 once revealed will not again be available for selection or the player. Thus, all future selections must be from remaining unselected globes 16. Each of the associated values if numerical, is to be multiplied by the total wager made in currency slot 17 by the player to determine the player's bonus award. If the attribute on the picked globe 16 when rotated into view is one of the two phrases (i.e., "Believe It" or "Not!"), no immediate award is given as both phrases are needed in order to receive an award. Some globes 16 may also have another hidden attribute, one or more extra picks, in conjunction with a numerical value. The play of the bonus game is over when the player's picks are exhausted or used up and the bonus award made.

As globes 16 are chosen, player receives credits for the associated awards and (as appropriate) additional associated picks. If player selected both the "Believe It" and "Not!" globes 16, then 15× the player's wager is awarded. By way of example, in a possible game the player begins with a wager and then 3 picks. The first pick is a globe16 at position 12 (in the preceding table) and awards the player 6× the wager made. The number of picks decrements to 2 remaining, that is, 3 picks minus 1. Suppose the second pick is globe 16 in position 4 in the table. The player is then awarded 2× the wager made plus two additional picks, decreasing the player's remaining 2 picks by 1 before adding the two picks won so that now 3 picks are left. The player's third pick is globe 1 which awards the player 1× the wager made, leaving the player with 2 picks remaining. Now the prolongation of the bonus play can be understood from this example. Assume the player's fourth pick is globe 16 in position 7 of the example table and awards the player 2× the wager made and an additional pick, leaving the player with 2 picks remaining. If the player's fifth pick is globe 16, table position 14 and the player receives no numerical value award and no additional picks. In the prolonged bonus play the player has 1 pick remaining. The player's sixth pick is globe 16 in table position 13 and awards the player 8× the wager made, leaving the player with no more picks. Hence the bonus game play is over, and the player would be awarded a grand total of 6×+2×+1×+2×+8×=19× the wager made for playing the bonus game. Note that if, on the final pick, the player had instead chosen globe 16, in position 15, then 15× the wager would be awarded for picking both globe 16, in position 14 and globe 16 of position 15 so the player's win is 11 plus 15 for a total of 26.

It should be appreciated that while the player began with only 3 picks, by choosing globes 16 that yielded additional picks, the player's successful selection enabled prolonged the bonus play totaling 6 picks. It is a feature of this method of play that a player may be able to considerably extend the time spent playing a bonus game. Any means can be used to make picks such as touch screen technology or the controls 19 in FIG. 1. A place 20 is on the display 12 presents icons to the player hiding the one or more attributes. A return path 21, as shown in FIG. 2, follows the path of the arrow from the penultimate block that returns upwardly to prolong play. The processor 15 has the program 14 and memory 13 for resuming operation of the base game after the player's initial number of choices and any others revealed are used. Where there is no base game the prolonged game is merely restarted with another wager as per the flow in FIG. 2.

In a second embodiment particularly suitable to playing a casino adaptation of the home board game, "Clue", cards 20 are used as objects instead of the globes 16 in the preceding example. The icons in this example are cards 20 are initially disposed with their faces down or away from the player's view of the video screen 11 hence all such predisposed face down cards 20 appear identical. Illustrative of the cards 20 would be FIG. 3 which can be understood to have the 3 by 5 matrix showing cards 20 (with any picture but here globe like pictures on the back of each). Once selected, each card 20 animates and turns face-up to reveal the name of a Clue® game character (e.g., Colonel Mustard) and hidden value (e.g., 15×), possibly in conjunction with a revealed number of extra picks (e.g., +1 pick). In addition, certain cards, rather than revealing a value, "warp" (move via the text "Secret Passage") the player to another set of icons or objects with generally greater values. Consider the following table example of how such a "Clue"® casino video game might be played:

| | | |
|---|---|---|
| Suspect screen | | |
| Miss Scarlet | 10 | |
| Colonel Mustard | 15 | +1 pick |
| Mrs. White | 20 | |
| Mr. Green | 25 | +2 picks |
| Mrs. Peacock | 30 | |
| Professor Plum | 35 | |
| Secret Passage to Weapon Screen | | |
| Weapon screen | | |
| Knife | 20 | |
| Lead Pipe | 30 | +1 pick |
| Rope | 40 | |
| Wrench | 50 | |
| Revolver | 60 | |
| Candlestick | 25 | |
| Secret Passage to Room Screen | | |
| Room screen | | |
| Ballroom | 100 | |
| Conservatory | 200 | |
| Billiard Room | 300 | |
| Library | 400 | |
| Study | 500 | |
| Hall | 250 | |
| Lounge | 175 | |
| Dining Room | 125 | +1 pick |
| Kitchen | 150 | |

The player always starts at the "Suspect" video screen 11 and is initially given 2 picks. As before, the player chooses hidden icons, objects or cards, in this case face down cards 20. Once chosen, each card 20 turns to reveal its face. The hidden value revealed, (multiplied by the player's wager) is awarded by credit or coin pay out to the player. Also as before, should the player choose a card 20 that awards additional picks, this is added to the player's current number of picks remaining. Additionally, however, should the player select the card 20 that reveals "Secret Passage," the video screen warps changing to show a new set of icons or objects for the player to select from and to continue the bonus play. In a preferred embodiment, the choosing of the "Secret Passage" would not use up that pick.

A possible game is described by way of example. The player begins in the Suspect screen with 2 picks. Suppose the first card picked reveals Professor Plum and awards the player 35× the wager made while decrementing the number of picks from 2 to 1. The player's second pick is the Secret Passage card and that "warps" the player to the Weapon screen, still with the 1 pick remaining since in the preferred embodiment selecting the Secret Passage has not used up a pick. If the player's third pick is the Lead Pipe, the bonus award is 30× the wager made, leaving the player with 1 pick remaining. The player's fourth pick might be the Rope and the player award of 40× the wager made and no more picks remaining. Hence the game is over, and the player would be awarded for playing the bonus game a grand total of 35×+30×+40×=105× the wager made.

By finding the hidden "warp" card 20, the player may be given new sets of cards 20 or icons or any other objects to select from whose value is generally greater than those of the current set on the video screen 11 prior to revealing the "warp" card. Prolongation of the bonus play continues interest in the base game and creates suspenseful play in the bonus game.

Note that it is possible to set a "goal" or "target" for the game by having one object serve as the grand prize. For example, it is possible for an icon, object or card 20 to have a hidden value that is not a specific numerical value but rather the sum of all other numerical values. In this manner, the game has, as its goal, to select the object with the "Winner Take All" award value. Of course, the examples and teachings of this disclosure with regard to numerical awards and extra picks are equally useful and valid in such a play scheme or environment.

While the terms selections, choices, or picks and similarly globes, cards, objects or icons are used interchangeably throughout, the intention is to include the wide range of appropriate dictionary definitions or meanings those terms within the context of this disclosure and the appended claims. Although attributes such as values, modifications, extra picks, grand prize, etc. are specifically disclosed any attributes that prolong the bonus play are sought to be within the scope of the claims. Skilled artisans will appreciate that a wide variety of object arrangements can be programmed, for example into a computer that drives the video bonus screen(s) during play of the bonus game.

What is claimed:

1. A method of playing a bonus game, entry to which is afforded from a base game, the bonus game having a finite number of icons, the method comprising the steps of:

a) providing said bonus game a plurality of sets of icons, the plurality of sets of icons forming a story, each set of icons formed from a subset of the finite number of icons, at least one icon in a set of icons has a hidden attribute that provides a warn to a designated set in the plurality of sets of icons forming the story;

b) making a wager in the base game;

c) ascribing at least one hidden attribute to each of the finite number of icons, d) ascribing at least one additional hidden attribute to at least one of the icons in the finite number of icons, the at least one additional hidden attribute containing one or more additional number choices;

e) giving a player an initial number of choices that is depicted to the player;

f) letting the player choose one icon;

g) revealing to the player the hidden attribute and any additional hidden attribute on the icon chosen by the player;

h) if the chosen icon contains the additional hidden attribute indicating an additional number of choices, prolonging play of the bonus game by increasing the initial number of choices with the additional number of choices in response to revealing the at least one additional hidden attribute;

i) awarding the player based on the revealed hidden attribute;

j) reducing the initial number of choices whenever the player chooses an icon in any set of icons;

k) repeating the steps f), g), h), i) and j) when the initial number of choices remain, l) ending the bonus game when the initial number of choices are used up.

2. The method of playing of claim 1 wherein the step of revealing the hidden attribute includes displaying a value.

3. The method of playing of claim 2 further comprising the step of multiplying the player wager by the value revealed in the awarding step.

4. The method of playing of claim 3 further comprising the step of summing the values of the hidden attributes revealed, then multiplying the sum by the wager made to calculate the player's total bonus award.

5. The method of playing of claim 2 further comprising the step of having one value of a hidden attribute be the sum of all other values in the other hidden attributes.

6. The method of playing of claim 1 wherein the step of revealing the hidden attribute includes displaying a warp.

7. The method of playing of claim 1 wherein the step of revealing the hidden attribute includes displaying a phrase that offers an award when combined with another phrase.

8. The method of playing of claim 1 further comprising the step of limiting the player to selecting another icon from remaining icons not chosen previously.

9. A method of playing a bonus game, entry for which is afforded in a base game, the bonus game having a finite number of icons, the method comprising the steps of:

a) providing said bonus game a plurality of sets of icons, the plurality of sets of icons forming a story, each set of icons formed from a subset of the finite number of icons, at least one icon in a set of icons has a hidden attribute that provides a warp to a designated set in the plurality of set of icons forming the story;

b) wagering in the base game;

c) ascribing at least one hidden attribute to each of the finite number of icons, d) ascribing at least one additional hidden attribute to at least one icon in the finite number of icons, the at least one additional hidden attribute containing one or more additional number of choices;

e) letting a player entering the bonus game have an initial number of choices;

f) letting the player choose one of the finite number of icons;

g) revealing to the player any additional hidden attribute on the icon chosen by the player including the additional attribute containing the one or more additional number of choices;

h) increasing the initial number of choices by the one or more additional number of choices if the revealed icon includes said one or more additional number of choices;

i) awarding the player based on the revealed attributes;

j) reducing the initial number of choices whenever the player chooses an icon that does not reveal a warp;

k) repeating steps f), g), h), i) and j) when the initial number of choices remain, l) ending the bonus game when the initial number of choices are used up.

10. A method of playing a casino game, the method comprising:

providing said casino game a plurality of sets of icons, the plurality of sets of icons forming a story, each set of icons formed from a subset of a finite number of icons, at least one icon in a set of icons has a hidden attribute that provides a warn to a designated set in the plurality of sets of icons forming the story;

ascribing at least one hidden attribute to each of the finite number of icons;

ascribing at least one additional hidden attribute to at least one icon in the finite number of icons, at least one additional hidden attribute prolonging the casino game by increasing an initial number of picks;

displaying to a player of the casino game the initial number of picks when the casino game starts, enabling the player to pick icons from the icons, each picked icon revealing any hidden attribute including the additional hidden attribute that increases the initial number of picks, reducing the initial number of picks whenever the player chooses an icon in any set of icons;

increasing the initial number of picks if the picked icon contains the additional hidden attribute that indicates the increased number of initial number of picks;

ending the casino game when the initial number of picks, as increased by any increased number of initial number of picks of the chosen icon, is used up by the player.

11. The method of claim 10 wherein the casino game is a bonus game played with a casino base game.

12. The method of claim 10 wherein at least one of the finite number of icons has a hidden attribute that is an award and further comprising:

awarding the player based on any revealed award in a picked icon.

13. The method of claim 10 wherein at least one of the finite number of icons in each of the plurality of sets has a hidden attribute that is an award value and wherein the award value increases in each designated set moved to.

14. The method of claim 10 wherein when the player picks an icon that reveals a hidden attribute with a warp, the pick containing the warp attribute is not used as a pick in reducing the initial number of picks.

15. A gaming apparatus having a bonus game, the gaming apparatus comprising:

a display in the bonus game, the display adapted to display to a player an initial number of picks, and a plurality of sets of icons, the plurality of sets of icons forming a story each set of icons being formed from a subset of a finite number of icons, at least one icon in a set of icons having a hidden attribute that provides a warp to a designated set of icons in the plurality of sets of icon forming the story wherein at least one hidden attribute being ascribed to each of the finite number of icons, and at least one additional hidden attribute being ascribed to at least one icon in the finite number of icons, at least one additional hidden attribute indicating an increasing amount to an initial number of picks, when the bonus game starts, an input in the bonus game, the input adapted to receive picks of selected icons in the display from the player, software in memory, the software adapted to reveal any hidden pick number in the display of each icon picked as received in the input from the player, the software reducing the initial number of picks whenever the player chooses an icon in any set of icons, increasing the initial number of picks if the nicked icon contains the additional hidden attribute that indicates the increased number of initial number of picks, and ending the bonus game when the initial number of picks, as increased by any picked icon containing the additional initial number of picks, equals the received picks in the input from the player.

16. The gaming apparatus of claim 15 further comprising:

at least one icon in the finite number of icons having a hidden award, an award, the award determined by the software based on any revealed hidden award in the picked icons.

17. The gaming apparatus of claim 16 further comprising:

a wager wherein the award determined by the software is further based on the wager.

18. The apparatus of claim 17 wherein when the player picks an icon that reveals a hidden warp attribute, the pick of the icon containing the warp attribute is not used by the software as a pick in reducing the initial number of picks.

* * * * *

UNITED STATES PATENT AND TRADEMARK OFFICE

CERTIFICATE OF CORRECTION

PATENT NO. : 6,609,971 B2
DATED : August 26, 2003
INVENTOR(S) : Olaf Vancura

It is certified that error appears in the above-identified patent and that said Letters Patent is hereby corrected as shown below:

Column 6,
Line 24, "warn" should be changed to -- warp --.

Column 7,
Line 50, "warn" should be changed to -- warp --.

Column 8,
Line 45, "nicked" should be changed to -- picked --.

Signed and Sealed this

Twenty-first Day of June, 2005

JON W. DUDAS
*Director of the United States Patent and Trademark Office*